Patented Nov. 20, 1934

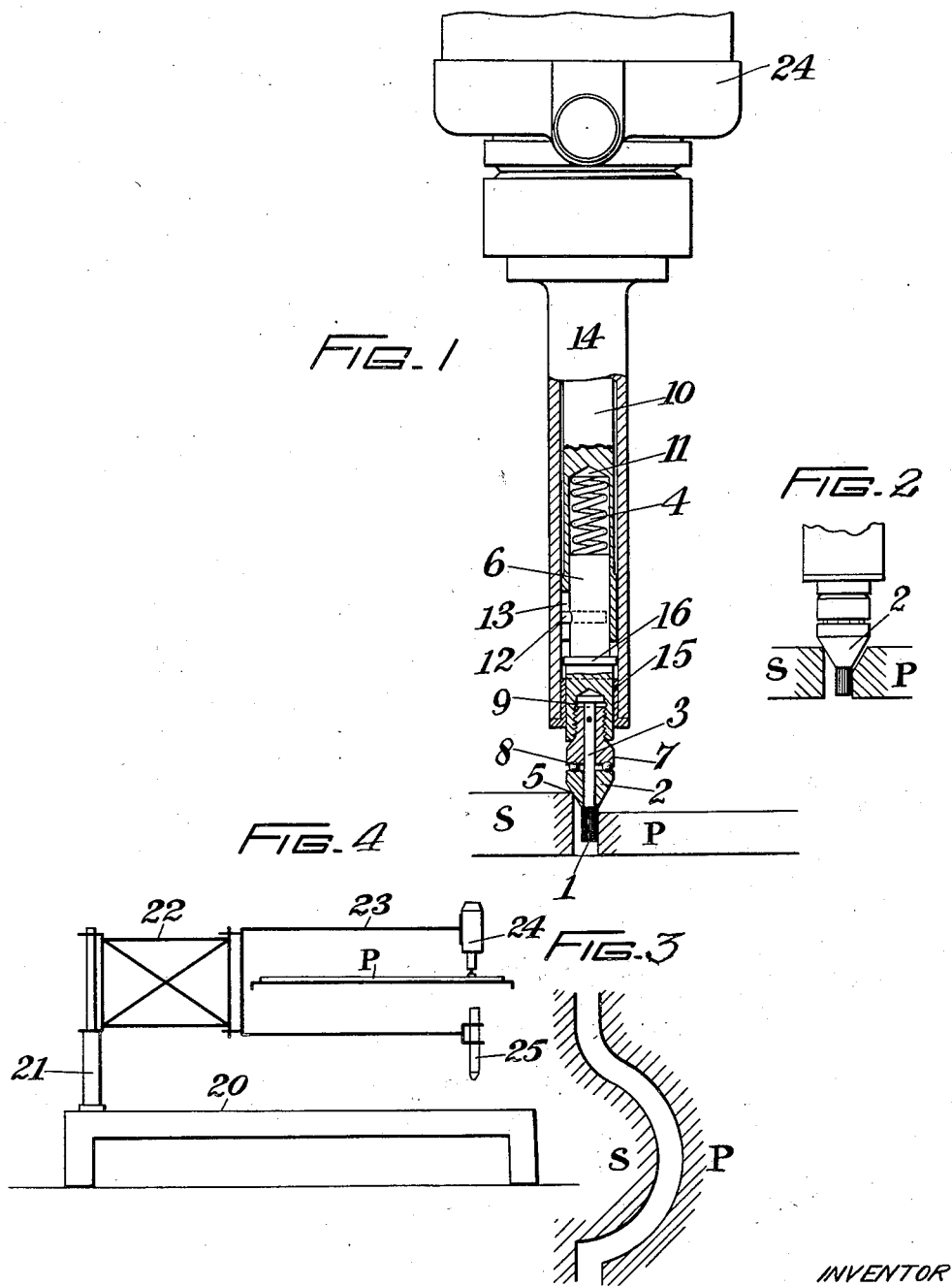

1,981,117

UNITED STATES PATENT OFFICE 1,981,117

TRACER MECHANISM

Edward Charles Frederick Oakley, Thornton Heath, England, assignor to Hancock & Company (Engineers) Limited, London, England, a British company Application May 3, 1933, Serial No. 669,253
In Great Britain May 5, 1932

9 Claims. (Cl. 33—23)

This invention relates to metal cutting and like copying machines with reference more particularly to the tracer mechanism thereof, said mechanism being employed in conjunction with a template or former for mechanically moving a cutting or like tool or burner along a path of predetermined shape.

The primary object of the invention is the provision of a new or improved device for thrusting a driving member included in the tracer mechanism in contact with the guiding template, said template being constructed from any suitable durable material, such as fibre, wood or metal in a manner well known in the art.

A further object of the invention is the provision of a thrust member and a secondary template for use therewith, said secondary template tracking the first template in the same plane or in a different plane, and said thrust member bearing against said secondary template so as to provide a reacting force which causes the driving member of the tracer mechanism to be thrust into close engagement with the guiding profile of the guiding template.

A further object of the invention comprises a thrust member in the form of a cone mounted in freely rotatable manner on the driving spindle of the driving member, said cone being adapted to thrust between said secondary template and said spindle for the purpose of contacting the driving member with the guiding template.

A still further object of the invention is the provision in a metal cutting or like machine of known type, for example, a machine comprising a hinged frame which supports the tracer above a cutting burner, of tracer mechanism in which the driving element thereof is thrust into engagement with its guiding template through the intermediary of a tracking template and a thrust member mounted on said tracer mechanism. The tracer mechanism is of any suitable known kind and the driving element may comprise a serrated cylinder or cone driven in known manner by electric, clockwork or other suitable power. In practice I prefer to make the diameter of the driving element the same as the diameter of the cutting jet so that the primary template used can be made to conform exactly to the shape of the cut it is desired to make.

The secondary template or former may be arranged outside or inside the primary template so as to provide a space or channel profiling the primary template, said channel having a width slightly greater than the diameter of the cutting jet.

In operation, the thrust member is made to bear against the profile of the secondary template with the result that the driving element is thrust away from this template and into contact with the primary template, the pressure between said element and the primary template always being maintained owing to the continual thrust between said thrust member and said secondary template.

It will be readily apparent to those skilled in the art that the two templates can be readily constructed from wood or metal of suitable thickness, by the use of a cutter with a cut slightly greater than the diameter of the cutting jet. The two pieces so provided will thus form the primary and secondary templates.

The above and other objects of the invention will be made clear by reference to the following description taken in conjunction with the accompanying drawing and the claims.

In the drawing:

Fig. 1 is a side elevation of the lower portion of a tracer element, shown partly in section, to which is applied one form of the invention comprising a roller provided with a cone bearing on the edge of a secondary template arranged higher than the primary template;

Fig. 2 shows a mechanism substantially similar to that shown in Fig. 1 except that the primary template is bevelled and its upper face is co-planar with that of the secondary template;

Fig. 3 is a fragmentary view showing the manner in which a primary template is tracked by a secondary template, and it may be considered for the present purpose, that secondary template S is outside primary template P or vice versa; and Fig. 4 is a diagrammatic view of one form of metal cutting or copying machine to which my invention may be applied.

In the example illustrated in Fig. 1 a roller 1 is thrust into good contact with the side of a primary template P owing to the lateral thrust produced when the curved surface of an inverted cone 2, freely rotatable on the spindle 3 of the roller, is pressed by means of a spring 4 against the top edge 5 of a secondary template S that tracks the profile of P (see Fig. 3). The pressure of the spring 4 is transmitted to the cone 2 by means of a shank 6, a nipple 7, and ball bearings 8 located between the bottom of the nipple and the upper end of the cone, said nipple being screw-threaded for engagement with a tapped socket 9 in the lower end of the shank 6. The shank 6 besides conveying the pressure of the spring to the cone 2 forms a telescopic driving connection between the driving shaft 10 of the tracer element and the nipple, spindle and roller 1. The upper end of the shank 6 is slidable within a bore 11 containing the spring 4 so that the spring is compressed when the cone 2 is brought into contact with the edge 5 and, therefore, the said spring effectively presses 2 into engagement with 5. A pin 12 engaging a longitudinal slot 13 in the lower part of the spindle 10 conveys the drive from 10 to 6 and permits free sliding movements of the said shank. The driving shaft and most of the shank are surrounded by a tubular case 14 and between the inner periphery of the lower part of the said case and the adjacent part of the shank there is disposed a bush 15 which engages a shoulder 16 on the shank and prevents the spring 4 or gravity ejecting said shank when the cone 2 is disengaged from the secondary template.

In Fig. 2 the templates P and S are co-planar and in order to make room for the cone 2 the template P is bevelled at 17.

In Fig. 4 the machine comprises a base 20 with a vertical column 21 at one end turnably supporting a gate 22 that is hinged at the end remote from the column to a frame 23 of U-form, the arms of the U being substantially horizontal and one of them terminating in a support for the tracer 24 and the other one terminating in a support for a burner 25. This machine is of known type and needs no further description.

It will be understood that the templates may be constructed of any suitable material such as wood, fibre, aluminium, copper, brass, steel and the like.

It is to be particularly noted that in the above construction the conical roller 2 is freely rotatable with respect to the tracer mechanism and that, therefore, this roller 2 serves simply as a guiding roller and has no function whatever as a driving roller. This is important, because it is found in practice that the gap between the primary and secondary templates cannot be readily and easily made of exact uniform width, and even where a gap of uniform width is provided, such gap quickly loses its uniformity by reason of wear, and this is particularly noticeable at bends, the sharper the bend, the greater the loss by reason of the fact that the tracer exerts greater wear or pressure on the templates when changing its direction.

It has been heretofore proposed to use a conical roller or similar type for cooperation with a template, but in such instances this conical roller has been used as a driving roller, i. e. a roller which transmits its revolution to the tracer mechanism. Under these circumstances, and incident to any irregularity in the exact uniformity of the width of the template channel, the rollers, both the guiding and driving roller, are bound to rise and fall according to this lack of uniformity. If the equivalent of the roller 2 in the structures previously proposed has a driving function, any rise and fall of such roller will obviously alter the drive of the tracer mechanism, and hence this drive will not be uniform.

In the construction above described, the roller 2, subject, of course, to the objection of rising and falling according to the irregularity developed in the tracer gap, is without any influence on the driving of the tracer mechanism, for this driving is performed solely and alone by the roller 1, which is cylindrical, and the driving effect of which is not in any way affected by the rise and fall of the rollers incident to the uniformity referred to. If the roller 2 is fixed and communicates its motion to the drive of the tracer mechanism, non-uniformity of this drive imparts a distinct disadvantage, which applicant's construction, subject to all the irregularities possible incident to wear or irregularity in the gap, entirely overcomes.

What I claim is:—

1. In a tracer mechanism for use with metal cutting and like copying machines, a driving member mounted on said mechanism, a guiding template, a second template mounted in tracking relationship with respect to the guiding template, and a thrust member mounted on said mechanism and adapted to bear against said second template and to force said driving member in contact with the guiding template, said thrust member being wholly free of any driving influence on the driving member.

2. In a tracer mechanism for use with metal cutting and like copying machines, a driving member mounted on said mechanism, a guiding template, a second template mounted in tracking relationship with respect to the guiding template, and a thrust member comprising a cone mounted for free rotation on and relative to said mechanism and adapted to bear against said second template and to force said driving member into contact with the guiding template.

3. In a tracer mechanism for use with metal cutting and like copying machines, a driving member, a driving spindle mounted on said mechanism, said member being mounted on said spindle, a guiding template, a second template mounted in tracking relationship with respect to the guiding template, and a thrust member mounted on and freely rotatable with respect to said driving spindle, said thrust member being adapted to thrust between said second template and said driving spindle so that said driving member is forced into contact with said guiding template.

4. In a tracer mechanism for use with metal cutting and like copying machines, a driving member, a driving spindle mounted on said mechanism, said member being mounted on said spindle, a guiding template, a second template mounted in tracking relationship with respect to the guiding template, and a thrust member comprising an inverted cone mounted on and freely rotatable with respect to said driving spindle, said cone being adapted to bear against said second template so as to thrust against said driving spindle and, therefore, thrust said driving member into contact with said guiding template.

5. In a tracer mechanism for use with metal cutting and like copying machines, a driving member mounted on said mechanism, a guiding template, a second template mounted in tracking relationship with respect to the guiding template, a thrust member mounted for free rotation on said mechanism, and a spring device mounted on said mechanism and adapted to engage said thrust member with said second template, said thrust member, therefore, forcing said 6. In a tracer mechanism for use with metal cutting and like copying machines, including a guiding template and a second template, a driving shaft mounted on said mechanism, said shaft having a longitudinal bore, a driving member, a driving spindle, said member being mounted on said spindle, a thrust member mounted on and freely rotatable with respect to said driving spindle, a telescopic drive-coupling between said shaft and said spindle, and a spring arranged in said bore and adapted to thrust against said coupling so as, through said coupling and said spindle, to contact said thrust member with said second template, said thrust member, therefore, forcing said driving member into contact with said guiding template.

7. In a tracer mechanism for use with metal cutting and like copying machines, a driving member mounted on said mechanism, a guiding template, a second template cooperating with the guiding template, a thrust member mounted for free rotation on said mechanism, and a spring device adapted relatively to urge said thrust member and said second template into contact so that said driving member is forced into engagement with said guiding template.

8. A construction as defined in claim 1, wherein the guiding template is arranged in one plane for cooperation with the driving member and a second template is arranged in another plane for cooperation with the thrust member.

9. The combination with metal cutting and like copying machines, of tracer mechanism comprising a driving member mounted on said mechanism, a guiding template, a second template mounted in tracking relationship with respect to the guiding template, and a thrust member mounted on said mechanism and adapted to bear against said second template and to force said driving member into contact with the guiding template, said thrust member being mounted for free rotation with respect to the driving member and being wholly free of any driving influence on said member.

EDWARD CHARLES FREDERICK OAKLEY.